United States Patent [19]
Friedman et al.

[11] 3,873,204

[45]* Mar. 25, 1975

[54] OPTICAL EXTINCTION PHOTOANALYSIS APPARATUS FOR SMALL PARTICLES

[75] Inventors: Mitchell Friedman, Yorktown Heights; Louis A. Kamentsky, Briarcliff Manor; Isaac Klinger, Yorktown, all of N.Y.

[73] Assignee: Bio/Physics Systems, Inc., Mohopac, N.Y.

[ * ] Notice: The portion of the term of this patent subsequent to Dec. 12, 1989, has been disclaimed.

[22] Filed: Nov. 29, 1972

[21] Appl. No.: 310,388

Related U.S. Application Data

[63] Continuation-in-part of Ser. No. 2,750, Jan. 14, 1970, Pat. No. 3,705,771.

[52] U.S. Cl. .................................................. 356/39
[51] Int. Cl. ............................................ G01n 33/16
[58] Field of Search ............ 356/39, 103, 104, 181, 356/201

[56] References Cited
UNITED STATES PATENTS

| | | | |
|---|---|---|---|
| 1,974,522 | 10/1934 | Twyman et al. | 356/39 |
| 2,731,877 | 1/1956 | Clamann | 356/128 |
| 2,816,479 | 12/1957 | Sloan | 141/92 |
| 2,875,666 | 3/1959 | Parker et al. | 356/39 |
| 3,327,119 | 6/1967 | Kamentsky | 356/39 |
| 3,413,464 | 11/1968 | Kamentsky | 356/39 |
| 3,480,369 | 11/1969 | Smythe et al. | 356/246 |
| 3,560,754 | 2/1971 | Kamentsky | 356/39 |
| 3,740,143 | 6/1973 | Groner et al. | 356/39 |

OTHER PUBLICATIONS

Cresland–Taylor et al., "An Electronic Blood–Cell–Counting Machine," BLOOD, Vol. 13, (1958), pgs. 398–409.

Primary Examiner—Ronald L. Wibert
Assistant Examiner—Conrad Clark
Attorney, Agent, or Firm—Curtis Ailes

[57] ABSTRACT

A narrow beam of light is directed through an optical chamber to intersect a thin stream of small particles to be optically analyzed. At least one photoresponsive pick-up element is positioned in direct alignment with the beam to detect the degree of extinction of light by each particle.

11 Claims, 3 Drawing Figures

3,873,204

OPTICAL EXTINCTION PHOTOANALYSIS APPARATUS FOR SMALL PARTICLES

This is a continuation-in-part of U.S. Pat. application Ser. No. 2,750 filed Jan. 14, 1970 by the same inventors for a "PHOTOANALYSIS APPARATUS," U.S. Pat. No. 3,705,771 issued Dec. 12, 1972, and now assigned to the same assignee as the present application.

The present invention relates to photoanalysis apparatus, and more particularly to photoresponsive apparatus for detecting various characteristics of small particles such as blood cells.

There is a great need for accurate analysis of the characteristics of groups of small particles such as in the analysis of air pollution and water pollution conditions. A particularly important field for such analysis is in medical research and diagnosis. For this purpose, blood cells and other biological cells must be analyzed.

In the present invention the analysis of small particles is accomplished optically be entraining the particles in a very thin stream of liquid so that the particles pass one by one in the stream through an optical scanning station. A photo-optical detecting device is arranged to detect the optical reaction of each particle to illumination from a beam of light.

In photoanalysis apparatus of the above description, it has been recognized that the light scattering effect produced by particles under observation varies according to different characteristics of the particles, including such factors as particle size, refractive index, and the presence of refractive and absorbent substances in the particles. Accordingly, the detection of scattered light from the particles provides a valuable method for determining the characteristics of the particles. Furthermore, the magnitude of the scatter radiation as a function of the angles or the ranges of angles over which the scattering of light occurs provide distinctive information. In apparatus heretofore available, it has generally been possible to detect light scattered by particles under observation only for a very small fixed range of scatter angles. This has been accomplished by projecting illumination to the particle by means of a lens having a mask over the central portion thereof to create a "cone of darkness" beyond the particle positioned at the focal point of the lens. The scatter illumination is detected within this cone of darkness.

It is an object of the present invention to provide a photoanalysis apparatus for optical analysis of particles in which very accurate measurements of scatter illumination can be made at any desired angle, or over any desired range of angles, without specific limitation to a particular cone of darkness.

In carrying out the above object, a structure is employed in which there is produced an extremely narrow beam of illumination directed at the particles, and photosensing devices are arranged at positions displaced from the beam to receive illumination scattered at predetermined angles from the beam by the particles.

Another problem in photoanalysis apparatus of the above description has always been the economical production of a suitable optical chamber through which the particles to be examined are passed and subjected to illumination. It has been previously thought to be absolutely essential to provide flat sides on this optical chamber in order to avoid distortion of the light beam directed through the chamber by the material of the side walls of the chamber.

Accordingly, it is another object of the present invention to provide a very satisfactory and economical optical chamber which need not have flat side walls in combination in an improved photoanalysis apparatus.

In carrying out the above object of the invention, a photoanalysis apparatus is provided having an optical chamber in the form of a cylindrical tube.

It is another object of the present invention to provide a photoanalysis apparatus for optical analysis of particles including means for the very accurate measurement of the effect of each particle in diminishing the direct transmission of illumination directed to the particles from a narrow beam of illumination. This measurement is also referred to as a measurement of the degree of extinction of light by each particle. This is an objective which cannot be achieved by the prior art cone of darkness structure because all of the illumination in the center of the beam which would measure unscattered illumination is blocked out by the cone of darkness.

Since the filing of the parent patent application, of which the present application is a continuation-in-part, and which is identified at the beginning of the specification, it has been discovered that this detection and measurement of the effect of each particle upon the transmission of unscattered illumination has an extremely important utility in enabling the user to determine the size of the particles under observation. The amount by which the unscattered illumination is reduced has been found to be generally proportional to the size of the profile area of the particle. The surprising discovery is that the degree of extinction of the light by each particle is effected mostly by diffraction of the light by the edges of the particle, so that the extinction measurement is substantially independent of the composition or opacity of the material of the particle, and is therefore an accurate measurement of particle size, substantially independent of other factors. Since it is substantially independent of particle material, or opacity, the measurement of the degree of extinction by each particle may also be characterized as a measurement of total scatter because the signal change is due primarily to the scattering of light away from the direct light path.

Further objects and advantages of the invention will be apparent from the following description and the accompanying drawings.

In carrying out the invention in one preferred form thereof, there is provided an apparatus for optical measurement of at least one characteristic of each particle of a group of small particles such as blood cells while the particles are suspended in a liquid, comprising a source of light, a housing comprised of a material which transmits light from said source and defining an optical chamber, means for moving the particle suspending liquid through said housing in a thin narrow stream to convey the particles in sequence through the stream one by one, and means for directing light from said light source into one side of said housing to intersect the thin stream of particles in a narrow beam substantially converging at the intersection with the stream of particles and operable to intercept the entire particle stream. There is provided at least one photoresponsive pick-up element positioned outside of said housing in alignment with the light beam on the side of said housing opposite to said light source to receive the unscattered illumination from the light beam to thereby detect and measure the effect of each particle upon the transmission of unscattered illumination from the light beam to thereby detect the degree of extinction of light by each particle.

Figure 1:
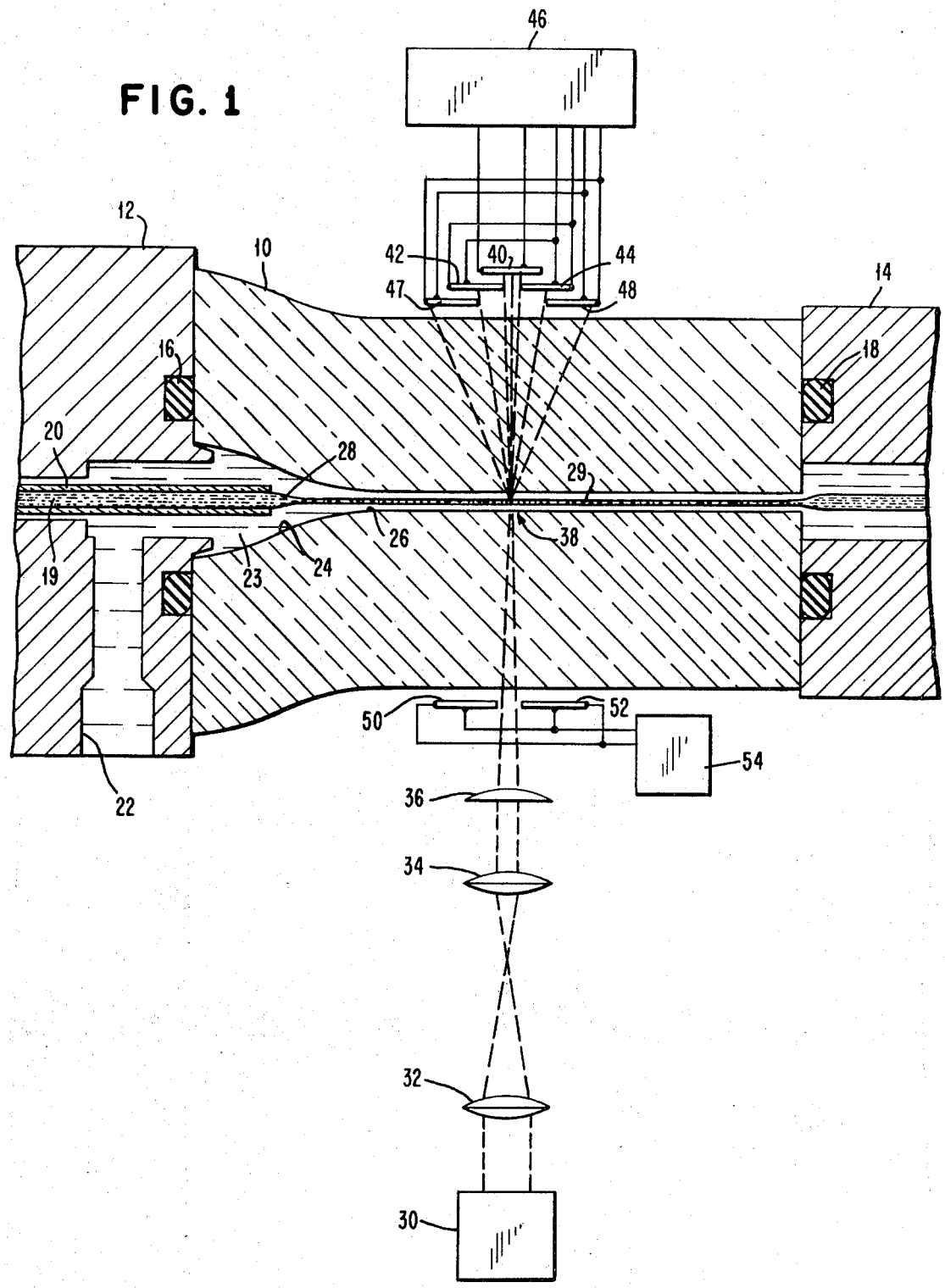
FIG. 1 is a schematic top view, partly in section, of the most essential elements of a photoanalysis apparatus in accordance with the present invention.

Referring more particularly to FIG. 1, there is shown an optical chamber formed by a glass tube member 10 clamped between metal members 12, 14, which respectively include liquid tight annular seals 16 and 18. The liquid 19 containing the particles to be observed enters the apparatus through a tube 20 centrally disposed within member 12. Another liquid 23, which forms a sheath for the liquid 19 containing the particles enters the member 12 through an entrance opening 22. The liquids come together in the cone or funnel-shaped entrance portion 24 of the central bore 26 of the cylindrical member 10.

The velocity and volume of flow of the particle-bearing liquid 19 entering through tube 20 and the other liquid 23 entering through entrance 22 are such as to cause the stream of particle-bearing liquid to be narrowed down at the end of the tube 20, as shown at 28, into a very narrow stream 29 having a maximum dimension of the same order of magnitude as the maximum dimension of the particles being carried by the stream. For instance, this dimension may be in the order of a 25 micron stream diameter. The particles of greatest interest are often somewhat smaller than this, being in the range from 1 to 10 microns in diameter. The liquid 23 may be referred to hereinafter as the "sheath flow" liquid since it forms a liquid sheath about the narrowed stream 29. In order to provide a smooth and non-turbulent flow of the sheath liquid 23, two or more radial inlet openings 22 may be provided to the central bore of the member 12. The funnel-shaped entrance portion 24 of the cylindrical member 10 is preferably provided with an exponential function shape in order to provide for smooth non-turbulent flow of the liquids at the critical position 28 where the particle-carrying liquid is narrowed down. The exponential function shape may be produced by a method of fabrication of the cylindrical housing member 10 which is shown and described in detail in the related parent U.S. Pat. No. 3,705,771, in connection with FIG. 6 of that patent, and in column 11 of the specification of that patent beginning at line 30. Typically, the particle-carrying liquid may be an aqueous solution and the sheath liquid 23 may be water.

The stream 29 of particles is illuminated by a beam of light emitted by a light source 30 which preferably consists of a laser. One satisfactory laser, for instance, is a helium-neon laser. The beam of light from the laser is reduced in diameter by a combination of spherical lenses 32 and 34. The resultant reduced diameter beam is collimated. This concentrated beam is narrowed by a lens 36 to provide a very narrow beam at the point 38 where the beam intersects with the stream 29 of particles under observation. For this purpose, the lens 36 is preferably a cylindrical lens having its cylinder axis arranged in a plane perpendicular to the axis of the chamber cylinder 10. Thus, the pattern of the illumination of the beam at the point 38 where it strikes the stream of particles is a very narrow ellipse which appears to be a thin line of light transverse to the stream of particles. This will be described more fully below in connection with FIG. 3.

Electrical photoresponsive pick-up elements are arranged around the outside of cylindrical chamber member 10 to detect different reactions of each particle to illumination from the beam through lens 36. For instance, an electrical photoresponsive pick-up element 40 is arranged in direct line with the beam to measure the effect of each particle in diminishing the direct transmission of illumination. This is also characterized as a measurement of "extinction." This diminution of direct transmission of illumination, as measured by pick-up 40 was previously characterized as "absorption." However, it has been discovered to be due almost entirely to "non-specific" absorption (diffraction and other optical scattering) and substantially independent of specific absorption. The resultant electrical signals are connected to apparatus schematically shown at 46 for amplification and recording or display. In the absence of a particle at the intersection of the beam, the beam strikes the element 40 without any substantial diminution.

As illustrated in the drawing, the beam diverges to a certain extent after having been converged at the center of the chamber at 38. The effective convergence and subsequent divergence in a practical embodiment has been limited to approximately one degree on each side of the center line of the beam as measured from the particle scanning point 38 at the center of the chamber. Thus, photoresponsive pick-up elements 42 and 44 are arranged on opposite sides of the direct beam and can be used to measure illumination scattered out of the direct beam by the particles over a selected range of angles from one degree up to a predetermined angular limit. For instance, this range of angles may be from 1 to 9°. It is apparent from this description that the pick-up elements 42 and 44 effectively mask the photoresponsive pick-up element 40 in the dimension parallel to the axis of chamber 10 so that only the direct illumination reaches that pick-up element. As indicated above, a typical width of the direct beam is approximately 1° on each side of the center line, making a total width of 2°. In apparatus of this description, it has been found that the direct beam may sometimes be somewhat wider, say up to 4° in width. However, the important feature is that the element 40 receives only the direct beam illumination, unscattered along the chamber axis dimension by the particles under observation. From the above description, it is apparent that the beam of light from the source 30, which is preferably a laser, is a narrow beam having well defined outer beam margins. The beam converges so that the outer margins of the beam are aligned at a convergence angle in the order of one degree with respect to the center line of the beam, and the subsequent divergence of the outer margins of the unscattered portions of the beam is at the same angle when viewed transverse to the axis of the chamber 10, as illustrated in FIG. 1.

As shown in the drawing, the photoresponsive pickup elements 42 and 44 may be electrically connected in parallel so that electrical signals resulting from illumination scattered on either side of the beam will be detected and may be recorded by the electrical apparatus schematically illustrated at 46. Additional pairs of photoresponsive pickup elements for detecting scattered light or other ranges of angles may be provided as shown at 47 and 48. For instance, this additional pair of pick-up elements may detect scatter over the scatter angle range from 9° to 22°. The wider angle scatter sensors 47 and 48 may be employed for the purpose of providing a measurement of specific optical absorption of the particles. It is known that specific absorption of the incident beam will decrease the amount of light scattered by the particles. This decrease in scattered illumination is more pronounced for the wider angle scatter, than for the near forward scatter detected by sensors 42 and 44. Accordingly, it has been found to be advantageous to use the wider angle scatter measurements at 47 and 48 to detect absorption.

Scattering of illumination from the particles in the reverse direction, called "back-scattering," can also be detected by photoresponsive elements 50 and 52 arranged on the same side of the chamber as the light source 30 and connected in parallel to an electrical pick-up and recording apparatus 54. It will be understood that the electrical apparatus 54 may be combined with the apparatus 46, but it is shown separately here to simplify the drawing.

The apparatus 46 and 54 may include amplifiers, logic circuitry, digital counters, and electronic display devices. It is one of the important features of the invention that different optical reactions of each particle to illumination may be detected, processed, and recorded substantially simultaneously. The relationships between these different optical reactions may be processed by analog and digital circuitry, displayed, recorded, and plotted as a basis for making detailed determinations about the particles, differentially classifying the particles, or determining the frequency with which particular characteristics appear in successive particles. Because of the unique features of this invention, particle analysis and counting rates in the order of ten thousand particles per second may be achieved. It will be understood that this speed is well within the capacity of the electronic and digital portions of the system.

The photoresponsive pick-up elements, such as elements 42 and 44 for the detection of scatter, are illustrated in FIG. 1 as though they were fixed with relation to the cylindrical chamber member 10. However, suitable means is provided for precisely changing the position of those pickup elements in relation to the beam from source 30. This may be an adjustment from side to side and it may also be an adjustment to place the elements in greater or lesser proximity to the scanning position 38. By moving the elements away from the scanning position, the inner margins of the elements may be precisely positioned with respect to the outer margins of the direct radiation beam directed to the absorption pick-up element 40. Thus, the elements 42 and 44 are capable, when so adjusted, of picking up scatter radiation over the narrowest possible angle outside of the direct radiation beam path.

Figure 2:
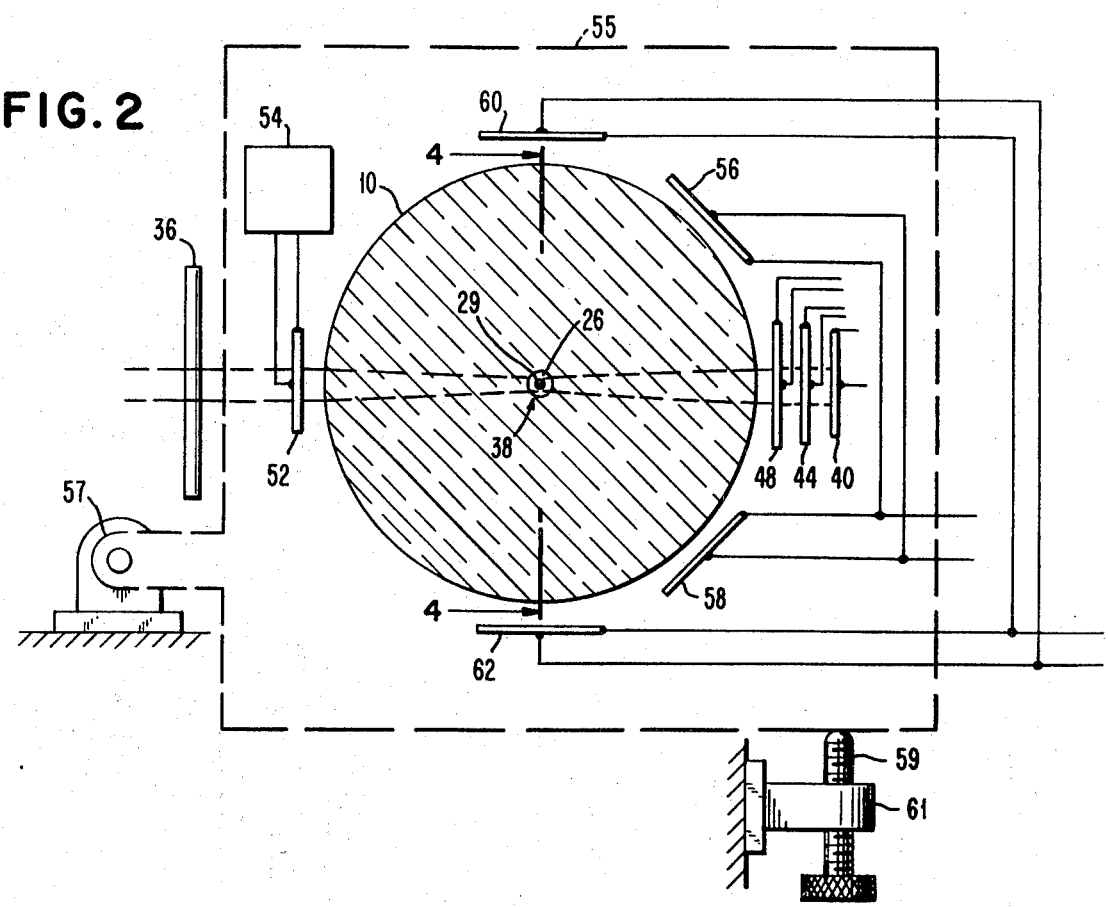
FIG. 2 is a sectional view of a portion of the apparatus shown in FIG. 1 and illustrating additional photo-optical pick-up elements for detecting scatter at additional angles.

FIG. 2 is a partial sectional side detail view of the apparatus of FIG. 1 including the cylindrical chamber member 10, the cylindrical lens 36, the absorption and scattering pick-up elements 40, 44, and 48, and the back-scattering pick-up element 52. As illustrated in FIG. 2, the cylindrical shape of the chamber member 10 causes a refractive effect upon the light beam supplied through the cylindrical lens 36 which causes the light beam to coverge towards the center bore 26 of the chamber member 10. This effect is shown in an exaggerated form in FIG. 2. The diameter of the beam as it enters the cylindrical lens 36 is actually selected so as to be approximately equal to the diameter of the center bore 26. This diameter is of the order of 250 microns. However, the convergence of the beam in the plane of FIG. 2 (perpendicular to the axis of the chamber member 10) is not a disadvantage since it serves to concentrate the beam in the central portion of the center bore 26 where the particle carrying stream is located. Since the particle carrying stream has a diameter of only about 25 microns, a considerable convergence of the beam is desirable. This provides relatively uniform illumination over the diameter of the particle-carrying stream, even though the original energy distribution from the laser beam is non-uniform. Furthermore, if the beam were not caused to converge upon the center bore 26, the outer portions of the beam would strike the interface between glass and liquid at the center bore 26 at an angle greater than the critical angle of refraction so that those outer portions of the beam would be reflected away from the center bore, and lost, without passing through the liquid.

FIG. 1 illustrated how pairs of photoresponsive pick-up elements such as 42 and 44, and 46 and 48, can be arranged in positions spaced away from the primary beam in directions parallel to the axis of the cylindrical chamber member 10 for detecting small angles of scattered illumination. However, as shown in FIG. 2, when larger angles of scatter are to be detected, the angular displacement of pick-up elements can be around the circumference of the cylindrical chamber member. Thus, as shown in FIG. 2, a pair of pick-up elements 56 and 58 may be circumferentially arranged to detect light scattered in a range at about 45 degrees from the particle scanning point 38. Similarly, pick-up elements 60 and 62 may be provided to detect scatter in a range near 90 degress. It will be understood that these arrangements of pick-ups are by way of illustration only. Particular analyses will require the detection of scatter for particular ranges of angles. The important principle illustrated by FIGS. 1 and 2 is that light scattered by particles under analysis can be detected for any selected ranges of scatter angles from essentially 1° up to 179° with the analyzer configuration as illustrated.

All of the components illustrated in FIG. 2, with the exception of the cylindrical lens 36, are preferably mounted upon and movable with a support block schematically shown as a box 55 pivotally supported on a fixed mounting at 57. The support block 55 may be vertically adjusted by rotation about the pivot 57 by means of a thumb screw 59 engaging the lower edge of the block 55. Thumb screw 59 is threadedly engaged within a fixed support 61. The purpose for this vertical adjustment is to precisely position the chamber 10 with respect to the light supplied from the light source through the cylindrical lens 36. If the light beam is not vertically centered upon the center bore 26 of the chamber 10, so that the beam accurately intersects with the stream 29 of particle-carrying liquid, then the device may be inoperative. The accurate positioning of the chamber with respect to the beam is very important because an offset in the positioning of the chamber with respect to the beam causes undue loss of beam energy through excessive refraction of beam energy at the bore 26.

In the embodiment of the invention illustrated in FIGS. 1 and 2, there is unavoidably a certain amount of radiation which is reflected radially outwardly from the scanning point 38 in a narrow ring which is confined to a longitudinal dimension along the cylinder of the cylindrical chamber member 10 generally corresponding to the width of the entering beam of illumination from source 30. Thus, the scatter detectors are always longitudinally displaced out of this ring of radiation and preferably arranged in pairs on opposite sides of the direct radiation position as shown by detectors 42 and 44 in FIG. 1. Similarly, in FIG. 2, the scatter detectors 56, 58, 60, and 62 each represent a pair of detectors preferably arranged on opposite sides of the ring of radiation.

The preferred photoresponsive pick-up elements to be employed in the present invention as thus far described may consist of silicon barrier layer photo diodes. These devices are photo-voltaic devices commonly referred to as silicon solar cells. Suitable devices of this kind are available from many commercial sources.

Figure 3:
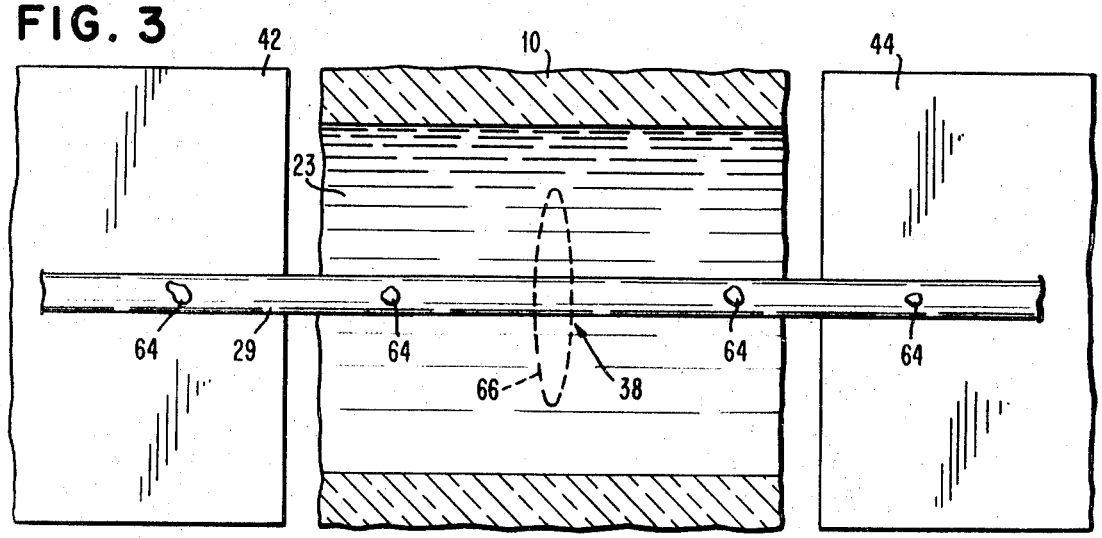
FIg. 3 is an enlarged sectional front view taken through a section at the center of the optical chamber of the apparatus of FIG. 1, and illustrating the intersection of the beam of light with the particles being measured.

FIG. 3 is an enlarged detail sectional front view of that portion of the apparatus of FIG. 1 where the light beam actually strikes the stream of particles at point 38 in the chamber 10. The stream of particles 29 is shown to contain actual entrained particles 64 which are transported one at a time through the elliptically shaped beam of light at 66. Because of the elliptical shape of the beam of light, the stream 29 carrying the particles 64 may vary in its position within the chamber without having the stream actually move out of the path of the beam. On the other hand, the narrow elliptical shape of the beam, in which the width of the beam is of substantially the same order of magnitude as the diameter of the particles, means that each particle causes an optimum optical reaction with the beam. Furthermore, even if the particles are closely spaced together, it is virtually impossible for more than one particle to be acted upon by the beam at any particular instant.

While this invention has been shown and described in connection with a particular preferred embodiment, various alterations and modifications will occur to those skilled in the art. Accordingly, the following claims are intended to define the valid scope of this invention over the prior art, and to cover all changes and modifications falling within the true spirit and valid scope of this invention.

We claim:

1. Apparatus for optical measurement of at least one characteristic of each particle of a group of small particles such as blood cells while the particles are suspended in a liquid, comprising a source of light operable to produce a narrow beam having substantially parallel beam elements and having well defined outer beam margins, a housing comprised of a material which transmits light from said source and defining an optical chamber, means for moving the particle suspending liquid through said housing in a thin narrow stream substantially centered in said chamber to convey the particles in sequence through the stream one by one, means for directing the narrow beam of light into one side of said housing to intersect with the thin stream of particles, said light directing means being operable to cause the beam to converge to the intersection with the stream of particles at a small angle of convergence between the outer beam margins to thereby concentrate the energy of the beam upon the particle stream, a photoresponsive pick-up element positioned outside of said housing in alignment with the light beam on the side of said housing opposite to said light source to directly receive the unscattered illumination from the light beam to thereby detect the degree of extinction of light by each particle, and masking means positioned in front of said photoresponsive pick-up element to intercept illumination scattered away from the direct path of the light beam by the particles in the particle stream to thereby mask said photoresponsive pick-up element from scattered illumination.

2. Apparatus as claimed in claim 1 wherein the maximum value of each transverse dimension of the thin stream of particle-suspending liquid is of the same order of magnitude as the maximum dimensions of said particles.

3. An apparatus for rapid optical measurement of the characteristics of small particles such as blood cells while the particles are suspended in a liquid, comprising a source of light operable to produce a narrow beam having substantially parallel beam elements and having well defined outer beam margins, a cylindrical tube member defining an optical chamber, said tube member being comprised of a material which transmits light from said source, means for directing the narrow beam of light into one side of said tube member in a beam substantially converging at the center of said optical chamber when viewed in a direction perpendicular to the axis of said tube member defining said chamber, means for moving the particle suspending liquid through said tube member in a thin narrow stream substantially centered in said chamber to cause the particles therein to pass in sequence through said light beam one by one, a photoresponsive pick-up element positioned and arranged in direct alignment with the light beam on the side of said tube member opposite to said light source to directly receive the unscattered illumination from the light beam to thereby detect the degree of extinction of light by each particle, and masking means positioned in front of said photoresponsive pick-up element to intercept illumination scattered away from the direct path of the light beam by the particles in the particle stream to thereby mask said photoresponsive pick-up element from scattered illumination.

4. Apparatus as claimed in claim 3 wherein said cylindrical tube member defining said optical member is in the form of a circular cylinder.

5. Apparatus as claimed in claim 3 wherein
said means for moving the particle suspending liquid through said tube member in a thin stream includes means for providing a sheath of liquid flowing in an annular configuration through said tube member and surrounding said thin stream to thereby confine the thin stream of particle suspending liquid to a dimension smaller than the interior diameter of said tube member.

6. An apparatus for rapid optical measurement of the characteristics of small particles such as blood cells while the particles are suspended in a liquid comprising
a housing defining an optical chamber,
a source of light operable to produce a narrow beam having substantially parallel beam elements and having well defined outer beam margins,
said housing member being comprised of a material which transmits light from said source,
means for moving the particle suspending liquid through said housing member in a thin narrow stream substantially centered in said chamber to thereby convey the particles in sequence through the light beam one by one,
means for directing the narrow beam of light from said light source into one side of said housing to intersect with the thin stream carrying the particles therein,
said means for directing said light being operable in cooperation with said side of said housing to converge said light beam at a small angle of convergence between the outer beam margins into a substantially elliptical shape in a plane transverse to the light beam and converging at the point of intersection with the position of the thin stream of particles to thereby concentrate the energy of the beam upon the particle stream,
the major axis of the elliptical shape of said beam being substantially perpendicular to the direction of the stream of particles and the dimension of said beam at said major axis being substantially greater than the transverse dimension of said particle stream,
a photoresponsive pick-up element positioned and arranged in direct alignment with the light beam on the side of said housing opposite to said light source to directly receive the unscattered illumination from the light beam to thereby detect the degree of extinction of light by the particles being measured,
and masking means positioned in front of said photoresponsive pick-up element to intercept illumination scattered away from the direct path of the light beam by the particles in the particle stream to thereby mask said photoresponsive pick-up element from scattered illumination.

7. Apparatus as claimed in claim 6 wherein
said means for directing said light is operable to form said light beam into said substantially elliptical shape such that the length of the minor axis is of the same order of magnitude as the maximum dimension of the particles to be observed and the major axis of the elliptical beam shape is substantially greater than the maximum dimension of the particles to be observed to thereby accommodate for variations in the path of movement of said particles with relation to the light beam as the particles move through the light beam.

8. Apparatus as claimed in claim 7 wherein
said means for directing said light comprises a substantially cylindrical lens device.

9. Apparatus as claimed in claim 6 wherein
said housing comprises a cylindrical tube member and
the direction of the thin stream of particle suspending liquid is in an axial direction through the interior of said tube member.

10. Apparatus as claimed in claim 9 wherein
said light source is a laser.

11. Apparatus as claimed in claim 10 wherein
said laser is a helium-neon laser.

* * * * *